Patented Dec. 4, 1928.

1,693,718

UNITED STATES PATENT OFFICE.

EDWIN C. E. LORD, OF WASHINGTON, DISTRICT OF COLUMBIA.

WATERPROOFING COMPOUND AND PROCESS OF MAKING THE SAME.

No Drawing.   Application filed September 1, 1928.   Serial No. 303,617.

(GRANTED UNDER THE ACT OF MARCH 3, 1883, AS AMENDED APRIL 30, 1928; 370 O. G. 757.)

This application is made under the act approved April 30, 1928, and the invention herein described, if patented, may be manufactured and used by or for the Government for governmental purposes without payment to me of any royalty thereon.

My invention relates to waterproofing foundations, walls, cellars, vaults, cisterns and buildings for whatever purpose by means of my new compound, a concentrated solution of a mixture of a bitumen and waxes in an organic solvent, which is employed either hot or cold. Heretofore, coal tar has been used for such purposes, but it is well known that the oils contained therein evaporated upon exposure to the air, causing the tar to disintegrate, powder and chip. As bituminous material for my new compound I use water gas tar, obtained by the manufacture of illuminating gas, either in a crude state or refined by distillation. I heat this tar to a temperature of about 125° F. and dissolve therein crude paraffin or other waxes to the extent of ten per cent, more or less, by weight of tar. To this solution I add from 10 to 15 per cent coal tar naphtha, or a similar solvent, to cause the compound to assume a thin liquid condition upon cooling (specific gravity 1.02 at 75° F.). It is understood, however, that the addition of naphtha or other solvent is not essential, and the tar-paraffin mixture may be employed without the solvent if heated to a thin liquid condition.

The chief advantage in the use of water gas tar in place of coal tar or other bitumens lies in its exceptional penetrating properties. This tar has been widely used for priming coats for concrete structures but has been found ineffective in repelling moisture unless incorporated with paraffin or other waxes as described in the above specifications.

In practice 500 pounds of tar (specific gravity below 1.08) and 50 pounds of paraffin are compounded with 75 pounds of naphtha at about 125° F.

The compound may be applied cold with brush or spray and it is essential that the structure treated should be sufficiently dry to permit the application of at least four coats, each coat to be completely absorbed before the succeeding coat is put on. If desired, a seal coat of asphalt, pitch or linseed oil paint may be applied directly upon the compound after the latter has become thoroughly incorporated in the concrete.

The essential waterproofing properties of my new compound are caused by the paraffin wax and water gas tar, which, when properly fluxed with a common solvent, enter the concrete to an appreciable extent (¼ inch or more), thereby closing all capillary pores and completely preventing the ingress of moisture.

I claim:

1. A new waterproofing compound which comprises a mixture of water gas tar and paraffin wax dissolved in coal tar naphtha, the mixture in liquid form and of a specific gravity of approximately 1.02.

2. A process for the manufacture of a waterproofing compound which comprises the mixing of water gas tar and paraffin wax dissolved in coal tar naphtha, and the reducing of the mixture to liquid form of a specific gravity of about 1.02.

3. A new waterproofing compound which comprises a mixture of water gas tar and paraffin wax.

EDWIN C. E. LORD.